United States Patent [19]
Berggvist et al.

[11] Patent Number: 5,408,731
[45] Date of Patent: Apr. 25, 1995

[54] PROCESS FOR THE MANUFACTURE OF INTEGRATED CAPACITIVE TRANSDUCERS

[75] Inventors: Johan W. Berggvist; Felix Rudolf, both of Bole, Switzerland

[73] Assignee: CSEM Centre Suisse d'Electronique et de Microtechnique S.A. - Rechere et Developpement, Neuchatal, Switzerland

[21] Appl. No.: 147,998

[22] Filed: Nov. 5, 1993

[30] Foreign Application Priority Data

Nov. 5, 1992 [FR] France ................ 92 13452

[51] Int. Cl.⁶ ................ H01G 7/00; H04R 31/00
[52] U.S. Cl. ................ 29/25.41; 29/594; 29/847; 361/283.1
[58] Field of Search ............ 29/25, 35, 25.41, 25.42, 29/594, 847, 609.1; 156/655, 656, 657, 659.1, 904; 361/283.1, 283.4; 381/191; 427/79, 80, 81

[56] References Cited

U.S. PATENT DOCUMENTS

| | | | |
|---|---|---|---|
| 4,513,348 | 8/1985 | Grantham | 361/283.1 |
| 4,615,105 | 10/1986 | Wada et al. | 29/847 X |
| 4,910,840 | 3/1990 | Sprenkels et al. | 381/191 X |
| 5,211,058 | 5/1993 | Fukiura et al. | 29/25.41 X |

FOREIGN PATENT DOCUMENTS

| | | | |
|---|---|---|---|
| 0331992 | 9/1989 | European Pat. Off. | |
| 153545 | 12/1979 | Japan | 29/594 |
| 86508 | 3/1989 | Japan | 29/25.41 |
| 158612 | 6/1992 | Japan | 29/594 |
| 2107472 | 4/1983 | United Kingdom | 29/25.41 |

OTHER PUBLICATIONS

"Silicon in mechanical sensors", Journal of Physics E. Scientific Instruments, vol. 1, No. 12, Dec. 1988, Bristol, Great Britain, pp. 1114–1128.

"Mikrosensoren und-aktoren Schöne kleine Welt", Technische Rundschau, vol. 83, No. 36, 6 Sep. 1991, Bern, Switzerland, pp. 72–75.

*Primary Examiner*—Peter Dungba Vo
*Attorney, Agent, or Firm*—Weil, Gotshal & Manges

[57] ABSTRACT

The process notably consists of assembling by welding by means of a connecting layer (16) a first (10) and a second substrate (12) of a semiconductor material, of thinning the second substrate (12) and, for each of the transducers, of structuring this second thinned substrate (12) to form a network of orifices (24) and of defining the contour of the fixed electrode of the transducer, of etching the first substrate (10) to form the diaphragm (28) of the transducer, and of eliminating the part of the connecting layer (16) which is located between the diaphragm (28) and the network of orifices (24) to separate this diaphragm (28) from the fixed electrode.

The invention has applications in the manufacture of transducers such as microphones.

11 Claims, 2 Drawing Sheets

PROCESS FOR THE MANUFACTURE OF INTEGRATED CAPACITIVE TRANSDUCERS

The invention relates to a process for the manufacture of a plurality of integrated capacitive transducers and in particular to a process for the manufacture of said transducers, especially those based on two semiconductor material substrates by a micro-machining technique and also to the assembly of said transducers. Transducers of this kind are in particular destined to be used as microphones.

BACKGROUND

Of the transducers or microphones in general use, most are of the capacitive, piezo-electrical or electrodynamic type. Of these, transducers of the capacitive type are distinguished by their good sensitivity, their large bandwidth, their great stability and their low consumption and are generally used in hearing aids on account of these qualities.

These capacitive transducers conventionally comprise a diaphragm or membrane which is sensitive to acoustic pressure, and a rigid support plate. The diaphragm is disposed facing the support plate and is separated therefrom by an open space of small thickness. These two elements thus each form one of the two electrodes of a condenser. When the diaphragm moves in response to an acoustic pressure, the capacity of the condenser changes and this change is detected by a preamplifier, the inputs of which are connected to this diaphragm and to the rigid support plate respectively.

A large variety of constructions of these conventional transducers exist and they can be manufactured from numerous materials, preferably from a metallised or metallic film as the material constituting the diaphragm and from silicon as the material constituting the support plate.

A transducer of this type and a process for its manufacture are described in the publication entitled "Development of an electret microphone in silicon" by A. J. Sprenkels et al., in the journal Sensors and Actuators, 17(1989), pages 509–512.

According to this known process, a silicon substrate is used which is oxidized to form a layer of $SiO_2$ on its upper and lower surfaces. The upper $SiO_2$ surface is then etched to form cavities in the surface of the substrate. The substrate is then oxidized again, after which the lower layer of $SiO_2$ is etched to form, on the one hand, air conduits each opening into one of the cavities provided on the upper surface and, on the other hand, passages adapted to fix the diaphragm and opening at the periphery of the cavities provided in the upper surface. The substrate is oxidized again and the diaphragm, composed of a sheet of Mylar ® (PETP), is disposed on the upper surface of the substrate in such a way that it covers the cavities and the passages, and is fixed to the substrate using a polymer which is pulverised in the fixing passages. The upper electrode is then deposited by evaporation onto the sheet constituting the diaphragm, whereas the lower electrode is formed by the silicon of the substrate.

The manufacture of these transducers according to this process does, however, present a number of disadvantages.

The substantial differences in the nature of the various materials used (Mylar ®, film silicon, polymer) lead to problems of incompatibility with the semiconductor material micro-machining technologies used in the manufacture of these transducers. Also, according to this process, it is impossible to achieve reproducible characteristics between series of transducers derived from different silicon wafers. Also, this process does not make it possible to overcome the internal mechanical stresses present in the diaphragm and, consequently, does not permit reliable control of the sensitivity of the transducer.

OBJECTS AND SUMMARY OF THE INVENTION

It is thus a main object of the invention to overcome the disadvantages of the above mentioned prior art by proposing a process of manufacture of a plurality of integrated capacitive transducers making it possible to supply these transducers with reliable and reproducible characteristics and only introducing materials compatible with the micro-machining technologies of the semiconductor materials.

It is thus an object of the invention to provide a process for the manufacture of a plurality of integrated capacitive transducers each comprising one mobile electrode and one fixed electrode, characterised in that it comprises the following stages:

supplying a first substrate of a semiconductor material, supplying a second substrate of a semiconductor material, forming a connecting layer of an insulating material on at least one first face of one of said first and second substrates, assembling by welding of said first and second substrates by means of said connecting layer in such a way that a first face of said second substrate is situated facing said connecting layer, thinning the second substrate and, for each of the transducers, structuring the second substrate by selective etching to form a network of orifices traversing the entire thickness of the second substrate and defining the contour of said fixed electrode, selective anisotropic etching of the first substrate to form a diaphragm extending substantially facing the network of orifices, eliminating the part of said connecting layer located between the diaphragm and the part of the second substrate comprising the network of orifices to form an open space between said diaphragm and said second substrate, and forming an electrical contact with each of said first and second substrates, said second substrate and the diaphragm forming said fixed electrode and said mobile electrode respectively.

The exclusive use of conventional semiconductor material micromachining techniques in the process of the invention permits maximum miniaturisation of the transducers and limits the process to a succession of very simple stages while still ensuring good control of the geometric and electrical parameters of the transducers.

BRIEF DESCRIPTION OF DRAWINGS

Other features and advantages of the invention will emerge from study of the following description of a process of manufacture according to the invention given purely by way of non-limiting example, this description being made in connection with the drawing in which.

DETAILED DESCRIPTION

Although the process of the invention permits the simultaneous production of a plurality of transducers on the same substrate, the description and the drawings will, for simplification, only refer to a single transducer.

Figure 1:
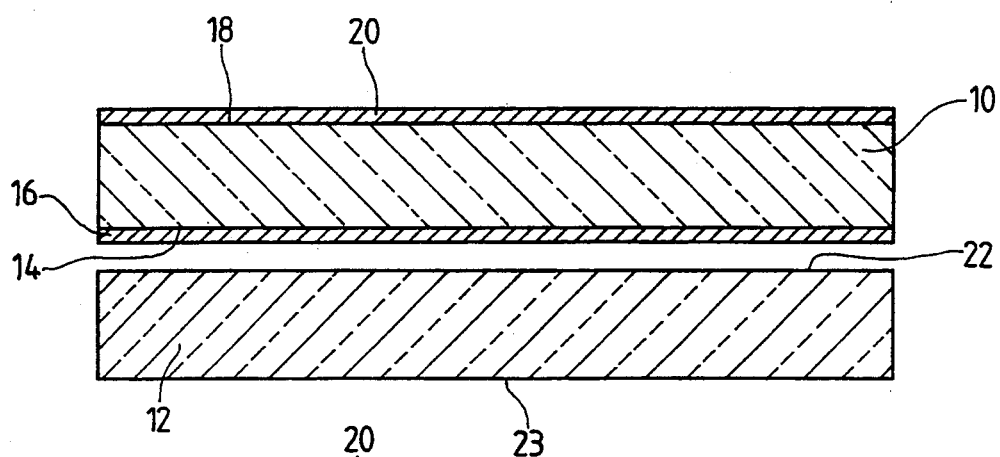
FIGS. 1 to 5 are sectional views along the line VI-VI of FIG. 6 of an integrated capacitive transducer shown in different stages of the process of manufacture of the invention.

It will be noted at the outset that, bearing in mind the small dimensions of the transducers and for practical reasons that will be easily understood, the process of manufacture of the invention is applied to the simultaneous manufacture of a large number of transducers, each having one fixed electrode and one mobile electrode separated by an open space of small thickness, on the basis of two complementary wafers defining a first substrate 10 and a second substrate 12 as shown in FIG. 1.

It is, moreover, important to note that the values of the various parameters, such as the temperatures, the times, the reagents used, etc., which will be mentioned below are in no way limiting and mainly depend on the materials and apparatus used. These values can easily be determined by the person skilled in the art.

The wafers (not shown) defining the first and second substrates 10, 12 on the basis of which the integrated capacitive transducer is manufactured are made of a semiconductor material such as monocrystalline silicon having the lowest possible specific resistance and, for preference, a <100> orientation.

FIG. 1 shows the first substrate 10 after the formation on a first 14 of its faces of a connecting layer 16 of an insulating material.

In this case, the connecting layer 16 is made of silicon oxide ($SiO_2$).

In the example described, the layer 16 has been formed by thermal oxidation of the first substrate 10 in an oven at about 1100° C. and under an oxidizing atmosphere for a few hours. By way of example, to obtain a layer 16 having a thickness of 3 microns, this first substrate 10 was left in the oven for about 15 hours.

It will be noted that the second face 18 of the first substrate 10 was deliberately not protected during this stage of formation of the layer 16, with the result that a layer 20 of the same thickness and the same nature as the layer 16 was also formed on this second face 18. This layer 20 will serve as a protecting layer for the subsequent stages of the process as will emerge from the following description.

It goes without saying that, in one embodiment, the formation of these layers 16 and 20 of $SiO_2$ can be produced by chemical or physical vapour phase deposition (CVD or PVD).

The layers 16 and 20 being formed on the first face 14 and the second face 18 respectively of the first substrate 10, the following stage consists, after suitable preparation of the first and second substrates 10, 12 with a view to their subsequent assembly, in positioning the second substrate 12 in such a way that a first of its faces 22 is situated facing the layer 16.

Preparation of the surface of the layer 16 and of the face 22 consists, for example, in cleaning these surfaces as described in the publication entitled "RCA Review" No 31, page 187, 1970.

After preparation of the two substrates 10, 12, the process continues with the assembly of these latter by means of autogenous welding. To do this, these two substrates 10 and 12 are inserted into a preheated oven at a temperature of about 1,000° C. and containing a nitrogen, oxygen or humid oxygen atmosphere.

It will be noted that, according to one embodiment, it is also possible to form a second connecting layer of the same nature on the first face 22 of the second substrate 12 and in the same manner as the connecting layer 20, or even to only form a single connecting layer on the first face 22 of the second substrate 12 with a view to producing the assembly by welding described hereinabove.

Figure 2:
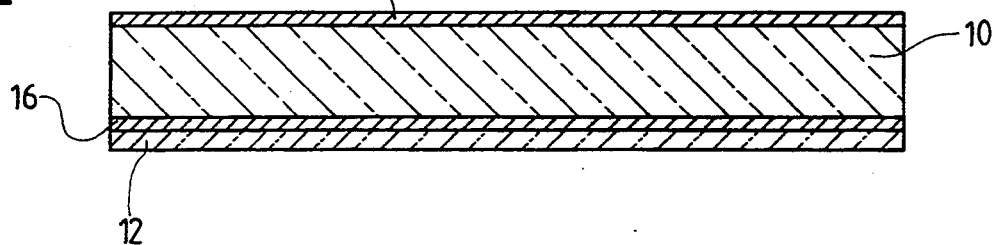

The following stage, illustrated in FIG. 2, consists of thinning the second substrate 12, that is, the second face 23 of this second substrate 12, which is exposed, is etched until this second substrate 12 reaches a determined thickness.

To do this the two substrates 10 and 12, assembled by the connecting layer 16 are, in the example described, deposited in a solution of an etching agent at a specific concentration, at a specific temperature and for a specific period of time to obtain the desired thickness.

To avoid etching of the first substrate 10 during this thinning stage of the second substrate 12, a selective etching agent that does not etch the layer 20 is preferably used, for example in the present case, a solution of KOH (potassium hydroxide).

Figure 3:
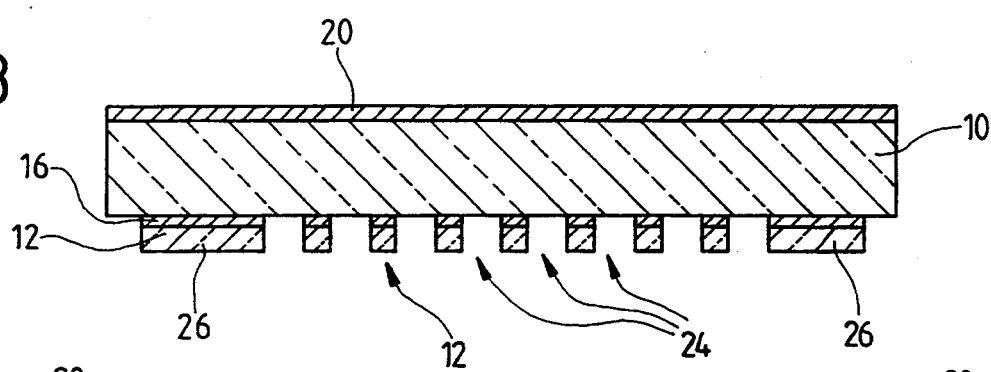
Figure 6:
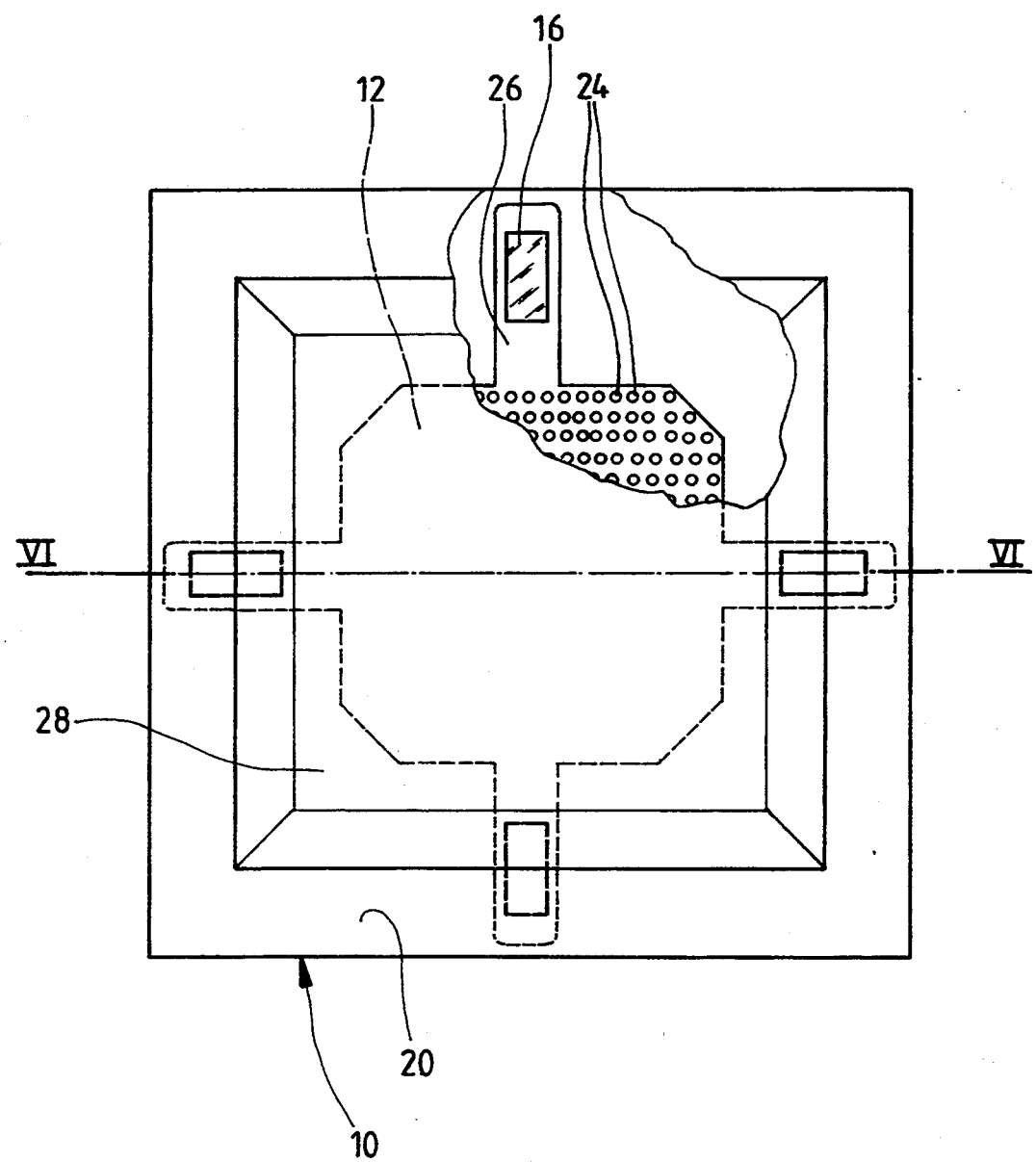
FIG. 6 is a plan view, partially exploded, of a transducer obtained according to the process of the invention.

FIG. 3 illustrates the structuring stage of the second substrate 12 thinned to define the contour of the fixed electrode of the transducer and to form a network of orifices 24 passing through the entire thickness of this fixed electrode. As may be seen in FIG. 6, the fixed electrode defined during this second stage of structuring of the second substrate 12 is shaped like a plate rigidly suspended from the first substrate 10 by means of several arms 26.

In order to do this, a first layer of photosensitive resin (not shown) is deposited, for example using a coating machine, on the exposed face of the second substrate 12, this layer of photosensitive resin being insulated by a mask (also not shown), the insulated parts of the layer of photosensitive resin are eliminated by conventional means, for example, using a liquid, and the parts of the second uncovered substrate 12 are etched anisotropically using a first etching agent to form the orifices 24. The parts of the connecting layer 16 situated at the bottom of these orifices 24 are then etched using a second etching agent and the remaining parts of the photosensitive layer are then removed.

The operation of etching the second substrate 12 is produced, for example, by means of a chlorine plasma, whereas the operation of etching the connecting layer 16 is produced, for example, by means of a solution of hydrofluoric acid (HF). Eliminating the remaining parts of the layer of photosensitive resin is produced in conventional manner, for example using a liquid in a suitable solvent or also by means of a plasma under oxygen $O_2$ atmosphere.

Figure 4:
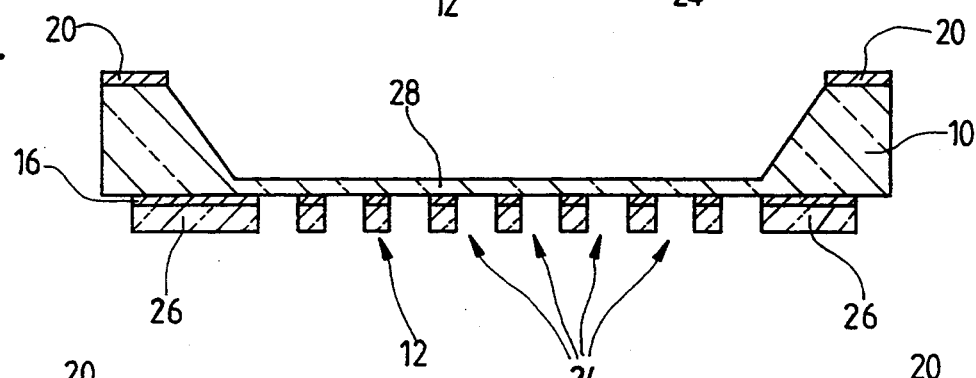

FIG. 4 illustrates the stage often etching of the first substrate 10 in order to form a diaphragm 28 extending substantially facing the network of orifices 24. This stage is identical with that described in connection with FIG. 3 except for the mask used and for the fact that the order of the first and second etching agents used to attack the second substrate 12 is inverted because of the need to eliminate first the protecting layer 20 and then to anisotropically etch the part of the first substrate 10 thereby disclosed, the protecting layer 20 and the first substrate 10 being made of $SiO_2$ and silicon respectively.

It should, nevertheless be clarified that, during this etch, the second substrate 12 as well as the connecting layer 16 are protected, for example mechanically, from any contact with the second etching agent.

Figure 5:
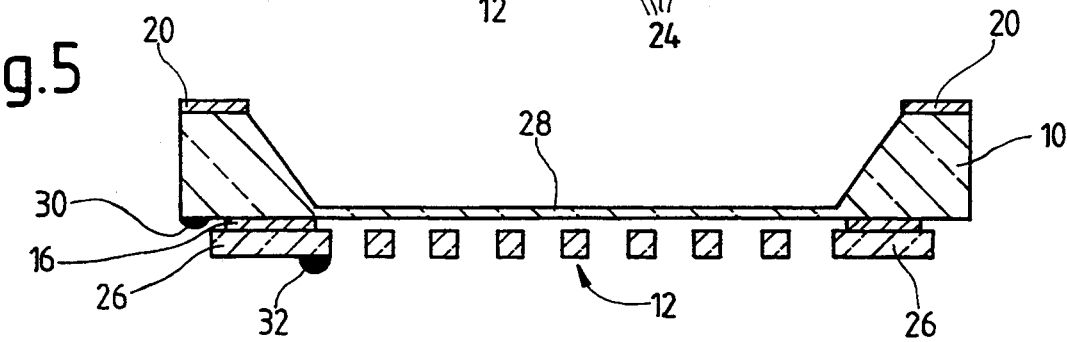

The following stages illustrated in FIG. 5 consist in releasing the diaphragm 28 by eliminating the part of the connecting layer 16 located between this diaphragm 28 and the part of the second substrate 12 comprising the network of orifices 24, and in producing electrical contact pads 30, 32 with the first substrate 10 and the second substrate 12 respectively.

Eliminating this part of the connecting layer 16 forms an open space between the diaphragm 28 and the second substrate 12. Elimination of this part of the connecting layer 16 is for example produced by chemical etching, using a solution of hydrofluoric acid (HF).

It will be noted in this connection that the average space between the orifices 24 is very small, with the result that the etching of the connecting layer 16 in the area of these orifices 24 is sufficiently fast not to weaken the bonds of the suspension arms 26 which extend at the periphery of the transducer between the first substrate 10 and the second substrate 12 and which are formed by the remaining parts of the connecting layer 16.

The contact pads 30, 32 are produced by vacuum evaporation of a metal, for example, of aluminium, through a mask (not shown). These contact pads 30, 32 may of course also be produced by cathodic sputtering.

The capacitive transducer thus formed, the mobile electrode and the fixed electrode of which are composed of the diaphragm 28 and the substrate 12 respectively, is then separated from the other transducers made at the same time and encapsulated in a housing, not shown, provided for this purpose.

It should be noted that the figures do not represent the exact relative dimensions of the various elements in relation to one another, these dimensions being, moreover, highly exaggerated for greater clarity. It should be noted that a transducer obtained using the process of the invention has the general dimensions $2.8 \times 2.8 \times 1.0$ mm$^3$, the surface of the diaphragm is about $2.0 \times 2.0$ mm$^2$, the thickness of the diaphragm is about $3.5 \times 10^{-6}$ m, the thickness of the fixed electrode is about $10 \times 10^{-6}$ and the thickness of the open space between the diaphragm and the fixed electrode, which is taken up by air, is about $3 \times 10^{-6}$ m. The orifices pierced in the fixed electrode have an approximate diameter of $30 \times 10^{-6}$ m. There are about 400 of these per mm$^2$.

We claim:

1. A process for the manufacture of a plurality of integrated capacitive transducers each having a mobile electrode and a fixed electrode comprising the steps of:
   supplying a first substrate of a semiconductor material having first and second faces,
   supplying a second substrate of a semiconductor material having first and second faces,
   forming a connecting layer of an insulating material on the first face of one of said first and second substrates,
   positioning said first faces of said first and second substrates with said connecting layer therebetween and welding said first faces together by means of said connecting layer, thereby producing a laminated assembly,
   thinning the second substrate of said laminated assembly, and, for each of the plurality of capacitive transducers, to be produced,
   structuring the second substrate by selective etching to form a network of orifices traversing the entire thickness of the second substrate and defining the area of said fixed electrode,
   selectively anisotropicly etching the first substrate to form a diaphragm extending substantially facing the network of orifices,
   eliminating the part of said connecting layer located between the diaphragm and the part of the second substrate comprising the network of orifices to form an open space between said diaphragm and said second substrate, and
   forming an electrical contact with each of said first and second substrate,
   said second substrate and the diaphragm forming said fixed electrode and said mobile electrode respectively.

2. A process according to claim 1 wherein said connecting layer is formed on the first face of the first substrate and in that, before assembly by welding of the two substrates, a second connecting layer is formed of an insulating material on said first face of said second substrate.

3. A process according to claim 1 wherein the thinning step comprises uniformly etching the second face of said second substrate down to a predetermined thickness.

4. A process according to claim 1 further comprising a step of forming a protecting layer on the second face of said first substrate.

5. A process according to claim 1 wherein the structuring step comprises the following successive steps:
   forming by photomasking techniques a protective resin coating over only the portions of the exposed face of the second substrate to be retained, leaving uncovered the portion of said second substrate to be etched away to form said orifices,
   etching said uncovered portions of said second substrate to form said network of orifices, and
   eliminating resin coating from said exposed face.

6. A process according to claim 4 wherein the step of selective anisotropic etching of the first substrate comprises the following successive steps:
   forming by photomasking techniques a protective resin coating only over the portions of the protecting layer to be retained, leaving uncovered the portion of the protecting layer covering the part of the first substrate to be etched,
   eliminating said uncovered part of said protecting layer by etching to uncover a part of said second face of said first substrate,
   etching said uncovered part of said first substrate to form said diaphragm, and
   eliminating the remaining parts of said first layer of protective resin.

7. A process according to claim 6 wherein, during the stages of elimination of the uncovered part of the protecting layer and of etching said first substrate, the second substrate is protected against any contact with the etching agents.

8. A process according to claim 7 wherein the second substrate is mechanically protected.

9. A process according to claim 1 wherein the elimination stage of said connecting layer is made using a liquid.

10. A process according to claim 4 wherein the steps of forming said connecting layer and of forming said protecting layer include causing an oxide of a semiconductor material of the first and of the second substrate respectively to grow thermally.

11. A process according to claim 1 wherein the stage of the formation of contacts comprises metallisation by vacuum evaporation.

* * * * *